US012608035B2

(12) United States Patent
Zeng et al.

(10) Patent No.: US 12,608,035 B2
(45) Date of Patent: Apr. 21, 2026

(54) ROCKER APPARATUS AND HANDLE REMOTE CONTROL

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN); Hui Qiu, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 108 days.

(21) Appl. No.: 18/664,539

(22) Filed: May 15, 2024

(65) Prior Publication Data

US 2025/0334992 A1 Oct. 30, 2025

(30) Foreign Application Priority Data

Apr. 28, 2024 (CN) ......................... 202420909475.1

(51) Int. Cl.
*G05G 9/047* (2006.01)
*G08C 17/02* (2006.01)

(52) U.S. Cl.
CPC ......... *G05G 9/04785* (2013.01); *G08C 17/02* (2013.01)

(58) Field of Classification Search
CPC ...... G05G 9/04785; G05G 1/04; G08C 17/02; A63F 13/24; A63F 2300/1043; H01H 9/061; H01H 23/003; H01H 23/141; H01H 23/146; H01H 2231/032; H01H 2239/006
USPC ............... 340/12.22, 672; 307/122; 200/339; 345/161
See application file for complete search history.

(56) References Cited

U.S. PATENT DOCUMENTS

| | | | | |
|---|---|---|---|---|
| 7,105,762 | B1 * | 9/2006 | Lee | H01H 23/025 200/449 |
| 2024/0242905 | A1 * | 7/2024 | Rana | H01H 23/04 |
| 2025/0036153 | A1 * | 1/2025 | Tian | G05G 1/015 |
| 2025/0128151 | A1 * | 4/2025 | Yu | G05G 1/04 |

FOREIGN PATENT DOCUMENTS

| | | | | |
|---|---|---|---|---|
| CN | 214427846 U | * | 10/2021 | |
| CN | 116271794 A | * | 6/2023 | A63F 13/24 |
| CN | 117654019 A | * | 3/2024 | A63F 13/24 |

* cited by examiner

*Primary Examiner* — Adnan Aziz
(74) *Attorney, Agent, or Firm* — Westbridge IP LLC

(57) ABSTRACT

Disclosed are a rocker apparatus and a handle remote control. The rocker apparatus includes a capacitive sensing assembly, a rocker assembly, and a control assembly. The capacitive sensing assembly includes a first electrode piece, a second electrode piece and a third electrode piece, the second electrode piece and the third electrode piece are provided on a same side of the first electrode piece; a first facing spacing is provided between the first electrode piece and the second electrode piece to form a first capacitor; and a second facing spacing is provided between the first electrode piece and the third electrode piece to form a second capacitor; the control assembly is electrically connected to the capacitive sensing assembly, and the electric control board is configured to output corresponding position information based on a ratio change of the capacitance of the first capacitor to the capacitance of the second capacitor.

8 Claims, 10 Drawing Sheets

ROCKER APPARATUS AND HANDLE REMOTE CONTROL

CROSS-REFERENCE TO RELATED APPLICATIONS

The present application claims priority to Chinese Patent Application No. 202420909475.1, filed on Apr. 28, 2024, the entire contents of which are incorporated herein by reference.

TECHNICAL FIELD

The present application relates to the technical field of remote control, and in particular to a rocker apparatus and a handle remote control.

BACKGROUND

At present, the unmanned aerial vehicle and e-sports game industries are developing rapidly, which require the use of control handles to remotely control. The direction control of the control handle is usually realized by the rocker apparatus. The consumers have increasingly higher requirements for control accuracy of control handles.

SUMMARY

The main purpose of the present application is to provide a rocker apparatus, aiming to improve the control accuracy of the rocker apparatus.

In order to achieve the above purpose, the present application provides a rocker apparatus, including: a capacitive sensing assembly, a rocker assembly, and a control assembly.

The capacitive sensing assembly includes a first electrode piece, a second electrode piece and a third electrode piece, the second electrode piece and the third electrode piece are provided on a same side of the first electrode piece; a first facing spacing is provided between the first electrode piece and the second electrode piece to form a first capacitor; and a second facing spacing is provided between the first electrode piece and the third electrode piece to form a second capacitor.

A part of the rocker assembly is swingably provided in the first facing spacing and the second facing spacing, and a capacitance of the first capacitor and a capacitance of the second capacitor are configured to change with a swinging of the rocker assembly.

The control assembly includes an electric control board and a capacity detection chip provided on the electric control board and is electrically connected to the electric control board, the electric control board and the capacity detection chip are electrically connected to the first electrode piece, the second electrode piece and the third electrode piece respectively; the capacity detection chip is configured to detect the capacitance of the first capacitor and the capacitance of the second capacitor; and the electric control board is configured to output corresponding position information based on a ratio change of the capacitance of the first capacitor to the capacitance of the second capacitor.

In an embodiment, the first electrode piece, the second electrode piece, and the third electrode piece each includes an electrode piece body and a connecting portion provided on the electrode piece body; the connecting portion is provided with a first end and a second end opposite to the first end; the first end is connected to the electrode piece body; and a curved dome portion is formed between the first end and the second end, and the curved dome portion is abutted against the electric control board.

In an embodiment, the curved dome portion is provided with a convex subsection connected to the electric control board.

In an embodiment, the capacitive sensing assembly further includes an electrode piece installation seat, and the installation seat is provided with an installation groove for installing the first electrode piece, the second electrode piece and the third electrode piece.

In an embodiment, the electrode piece body and the connecting portion are provided at an angle, and the connecting portion is snap-connected to the installation seat.

In an embodiment, the first electrode piece, the second electrode piece, and the third electrode piece each further includes a folding portion, and the connecting portion and the folding portion are provided on a same side of the electrode piece body.

In an embodiment, the connecting portion and the folding portion are provided on one side of the electrode piece body away from the first facing spacing and the second facing spacing.

In an embodiment, the rocker assembly includes a rocker body, a rocker arm sleeved on the rocker and a swing member provided on the rocker arm; the rocker is configured to push the rocker arm to swing; and the swing member is swingably provided in the first facing spacing and the second facing spacing.

In an embodiment, an end surface of the swing member inserted into one end of the first facing spacing and the second facing spacing is provided in a convex arc shape.

The present application also provides a handle remote control, including the rocker apparatus.

In the present application, the position information input by the user through the rocker assembly can be determined by detecting the ratio change of the capacitance of the two capacitors, which can avoid the impact of environmental factors (temperature and humidity, etc.) on the capacitance, thereby improving the control accuracy of the rocker apparatus.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
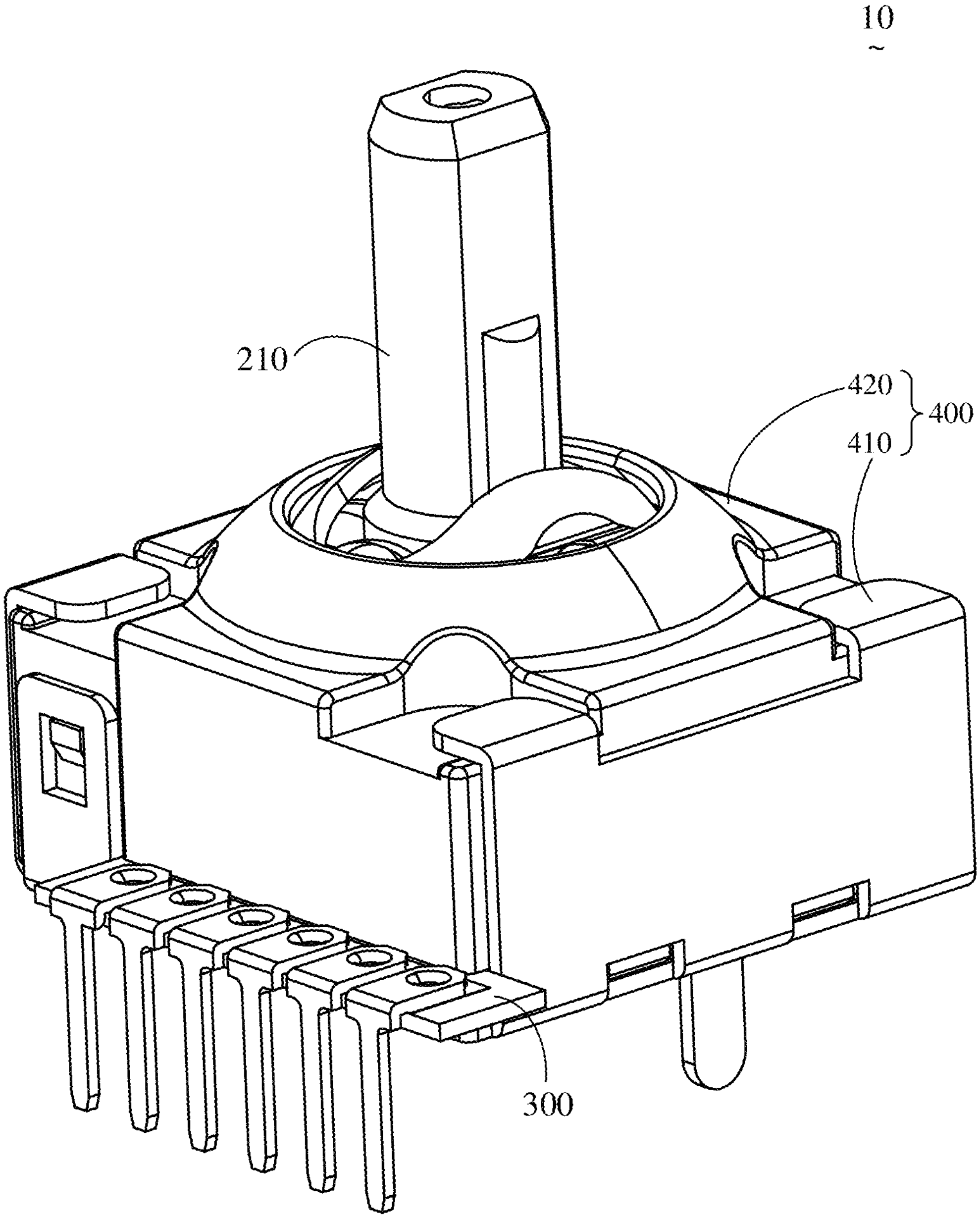
FIG. 1 is a schematic structural view of a rocker apparatus according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a rocker apparatus. For the convenience of understanding and explanation, in FIG. 1 to FIG. 10 attached to the description of the present application, solid arrows indicate spaces, slots or holes.

In the present application, as shown in FIG. 1 to FIG. 10, the rocker apparatus 10 includes a capacitive sensing assembly 100, a rocker assembly 200 and a control assembly 300. The capacitive sensing assembly 100 includes a first electrode piece 110, a second electrode piece 120 and a third electrode piece 130. The second electrode piece 120 and the third electrode piece 130 are provided on the same side of the first electrode piece 110. A first facing spacing 104 is provided between the first electrode piece 110 and the second electrode piece 120 to form a first capacitor, and a second facing spacing 105 is provided between the first electrode piece 110 and the third electrode piece 130 to form a second capacitor. Part of the rocker assembly 200 is swingably provided in the first facing spacing 104 and the second facing spacing 105. The capacitance of the first capacitor and the capacitance of the second capacitor can change with the swing of the rocker assembly 200. The control assembly 300 includes an electric control board 310 and a capacity detection chip 320 provided on the electric control board 310 and electrically connected to the electric control board 310. The electric control board 310 and the capacity detection chip 320 are electrically connected to the first electrode piece 110, the second electrode piece 120 and the third electrode piece 130 respectively. The capacity detection chip 320 is configured to detect the capacitance of the first capacitor and the capacitance of the second capacitor. The electric control board is configured to output corresponding position information according to the change of the ratio of the capacitance of the first capacitor to the capacitance of the second capacitor.

The rocker apparatus 10 serves as an input device and is usually used for operating handles of the unmanned aerial vehicle and game handles, etc. The rocker apparatus 10 includes a housing 400, a rocker assembly 200, a capacitive sensing assembly 100 and a control assembly 300. The housing 400 usually includes a bottom housing 410 and an upper cover 420. The bottom housing 410 and the upper cover 420 are enclosed to form an installation chamber for installing the rocker assembly 200, the capacitive sensing assembly 100 and the control assembly 300.

As for outputting the corresponding position information, taking the game handle as an example, the position information refers to the position information output by the player through the pitching operation to the rocker body 210, and the command information that can be used to complete interaction with the game software.

The rocker assembly 200 mainly includes a rocker body 210 and two rocker arms 220. The number of capacitive sensing assemblies 100 is adapted to the number of rocker arms 220. The rocker arm 220 is also provided with a swing member 230. The user moves the rocker body 210 to drive the rocker arm 220 to operate. The swing member 230 swings at the first facing spacing 104 and the second facing spacing 105 with the operation of the rocker arm 220. The capacitance of the first capacitor and the capacitance of the second capacitor may change as the swing position of the rocker body 210 changes. The swing member 230 can be integrally formed with the rocker arm 220, or the swing member 230 can be installed on the rocker arm 220. The rocker apparatus 10 usually includes two sets of capacitive sensing assemblies 100.

The capacity detection chip 320 is configured to detect the capacitance of the first capacitor and the capacitance of the second capacitor. The electric control board 310 is configured to detect the change in the ratio of the capacitance of the first capacitor to the capacitance of the second capacitor, and output the corresponding location information. It can be understood that the electric control board 310 is provided with a pin 311, and the electric control board 310 is electrically connected to the main control circuit in the handle remote control through the pin 311, thereby transmitting the corresponding position information to the main control circuit in the handle remote control.

As for the electric control board 310, the electric control board 310 is a circuit board with intelligent automation characteristics, which plays the role of the main control center in the equipment. The electric control board 310 usually includes a power input end and a power output end, an installation plate, and a control module, etc. The power input end and the power output end are configured to connect to the external power supply, and supply power to other components. The installation plate is also called as the bottom plate or motherboard, and is the core part of the electric control board 310, which configured to fix and connect to various electronic components. The installation plate is usually provided with clamping slots and connecting holes at left and right or upper and lower to fix and connect to various electronic components. The control module is configured for the control function of the electric control board 310. According to the actual needs, the control module can be a linear transformer, or a switching power module. In addition, the electric control board 310 can also be integrated with other components according to actual needs, such as communication interfaces, display interfaces, switch keys, etc.

As for the capacity detection chip 320, the capacity detection chip 320 is a chip capable of converting capacitance into voltage or other quantities, which is often used in capacity detection circuits. The basic measurement principle of the capacitor detection chip 320 is that the measured capacitor and the reference capacitor are charged and discharged in the opposite sequence at the same time, and the difference between the measured capacitor and the reference capacitor is converted into the voltage output through the current integration, the low-pass filtering, and the amplification, etc. In this embodiment, the capacity detection chip 320 is configured to detect the capacity value of the first capacitor and the capacity value of the second capacitor.

In the present application, the position information input by the user through the rocker assembly 200 can be determined by detecting the ratio change of the capacitance of the two capacitors, which can avoid the impact of environmental factors (temperature and humidity, etc.) on the capacitance, thereby improving the control accuracy of the rocker apparatus 10.

In an embodiment, the first electrode piece 110 is provided on a first plane, the second electrode piece 120 and the third electrode piece 130 are provided on a second plane, and the first plane is generally parallel to the second plane. Of course, it is also possible that the second electrode piece 120 and the third electrode piece 130 are not on the same plane. It is also possible that the first plane is not parallel to the second plane, which can also avoid the impact of environmental factors (temperature and humidity, etc.) on the capacitance, thereby improving the control accuracy of the rocker apparatus 10.

Figure 6:
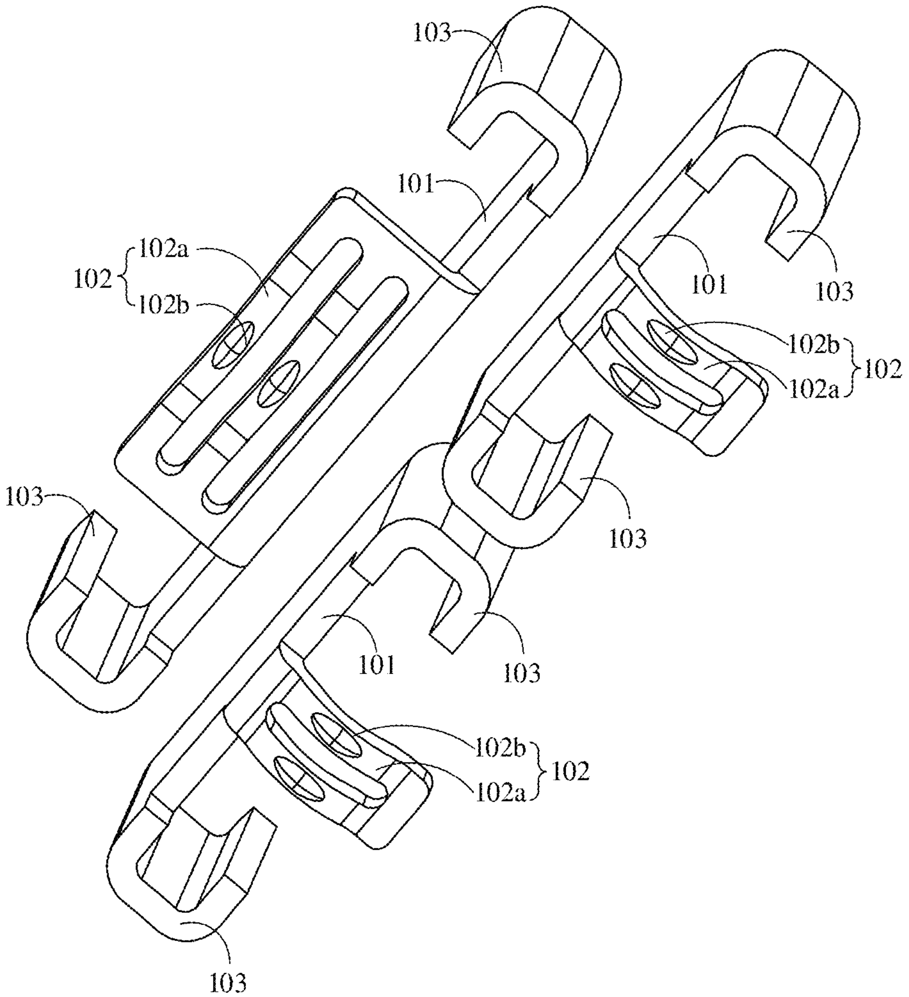
FIG. 6 is a schematic structural view of a first electrode piece, a second electrode piece and a third electrode piece in FIG. 4 according to an embodiment of the present application.
Figure 7:
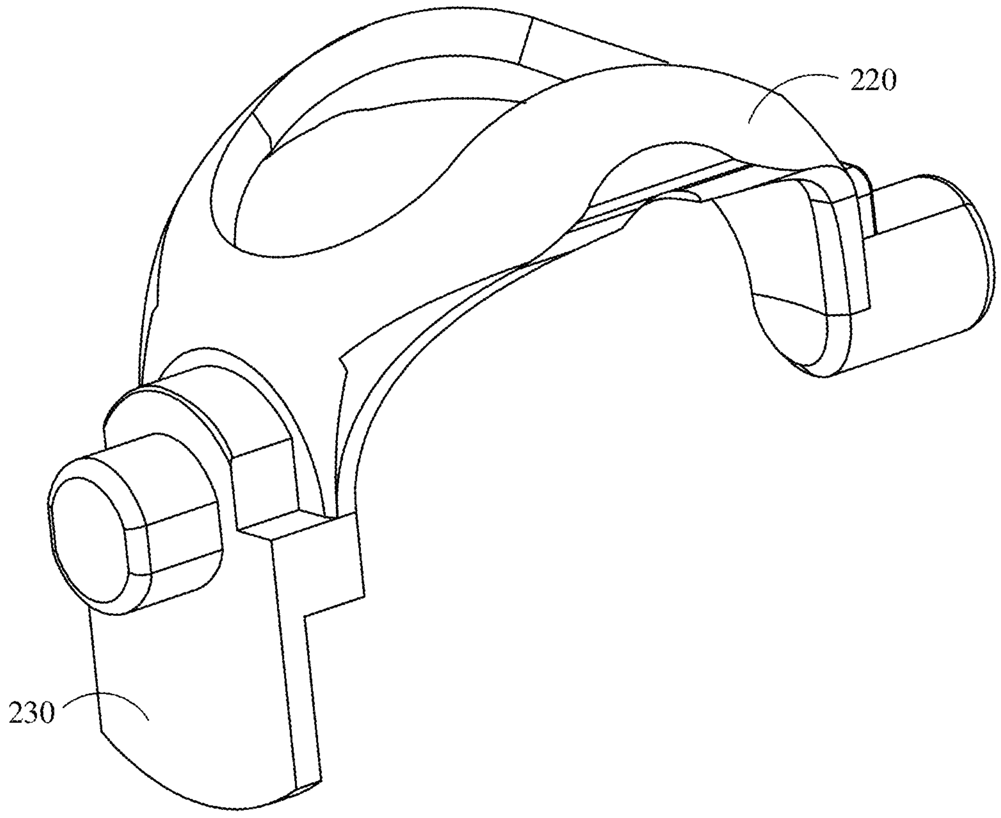
FIG. 7 is a schematic structural view of a swing member in FIG. 3 according to an embodiment of the present application.
Figure 8:
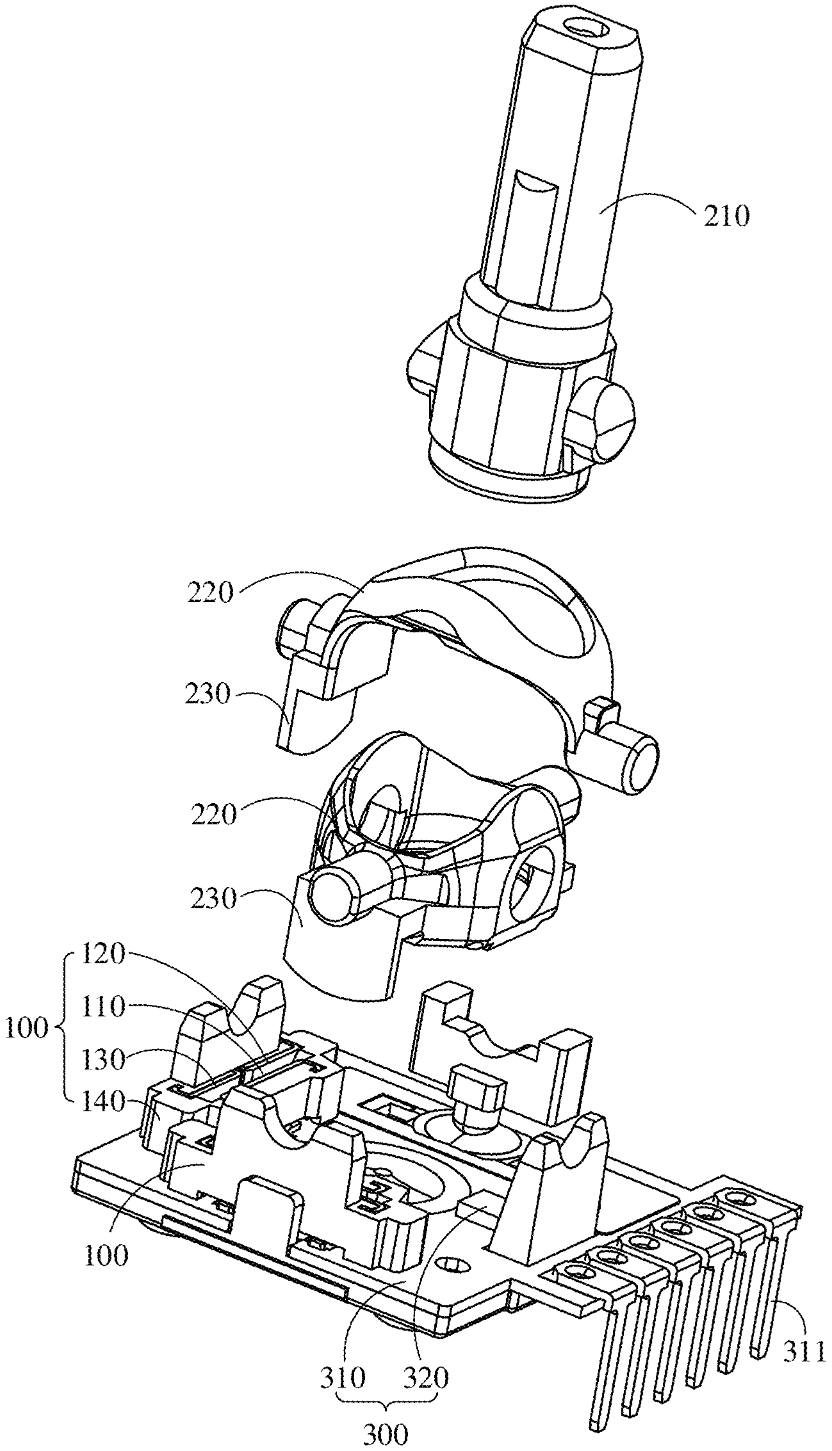
FIG. 8 is a partial exploded view of FIG. 3.
Figure 9:
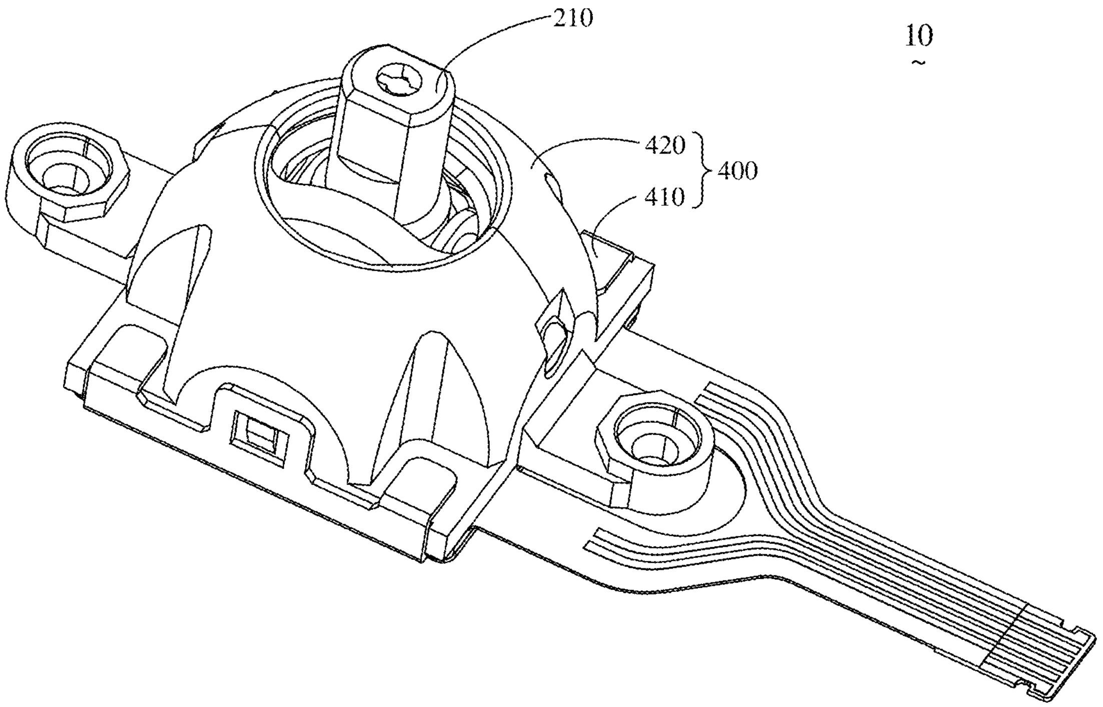
FIG. 9 is a schematic structural view of the rocker apparatus according to an embodiment of the present application.
Figure 10:
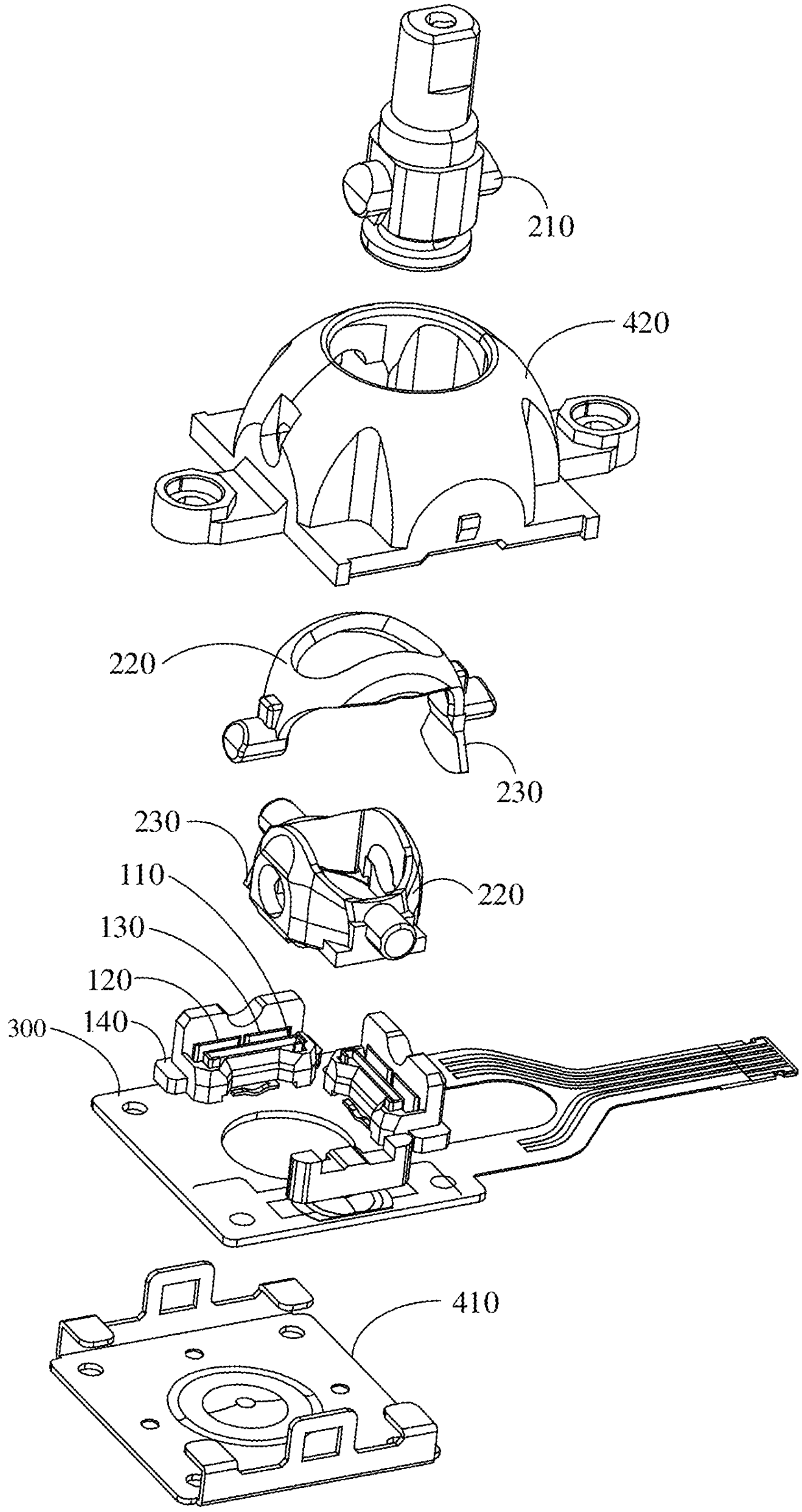
FIG. 10 is a partial exploded view of FIG. 9.

In an embodiment, please referring to FIG. 6, the first electrode piece 110, the second electrode piece 120 and the third electrode piece 130 respectively includes an electrode piece body 101 and a connecting portion 102 provided on the electrode piece body 101. The connecting portion 102 is provided with a first end and a second end opposite to the first end. The first end is connected to the electrode piece body 101. A curved dome portion 102*a* is formed between the first end and the second end. The curved dome portion 102*a* is abutted against and is electrically connected to the electric control board. In order to improve the stability of the connection between the curved dome portion 102*a* and the electric control board, the curved dome portion 102*a* is provided with a convex subsection 102*b*, and the convex subsection 102*b* is abutted against the electric control board. In this way, through the arrangement of the connecting portion 102, the first electrode piece 110, the second electrode piece 120 and the third electrode piece 130 can be directly connected to the circuit board without the need for additional connecting components such as wires, thereby simplifying the connecting structure of the first electrode piece 110, the second electrode piece 120, the third electrode piece 130 and the circuit board, and further simplifying the structure of the rocker apparatus 10, which is more conducive to the miniaturization of the rocker apparatus 10.

Figure 2:
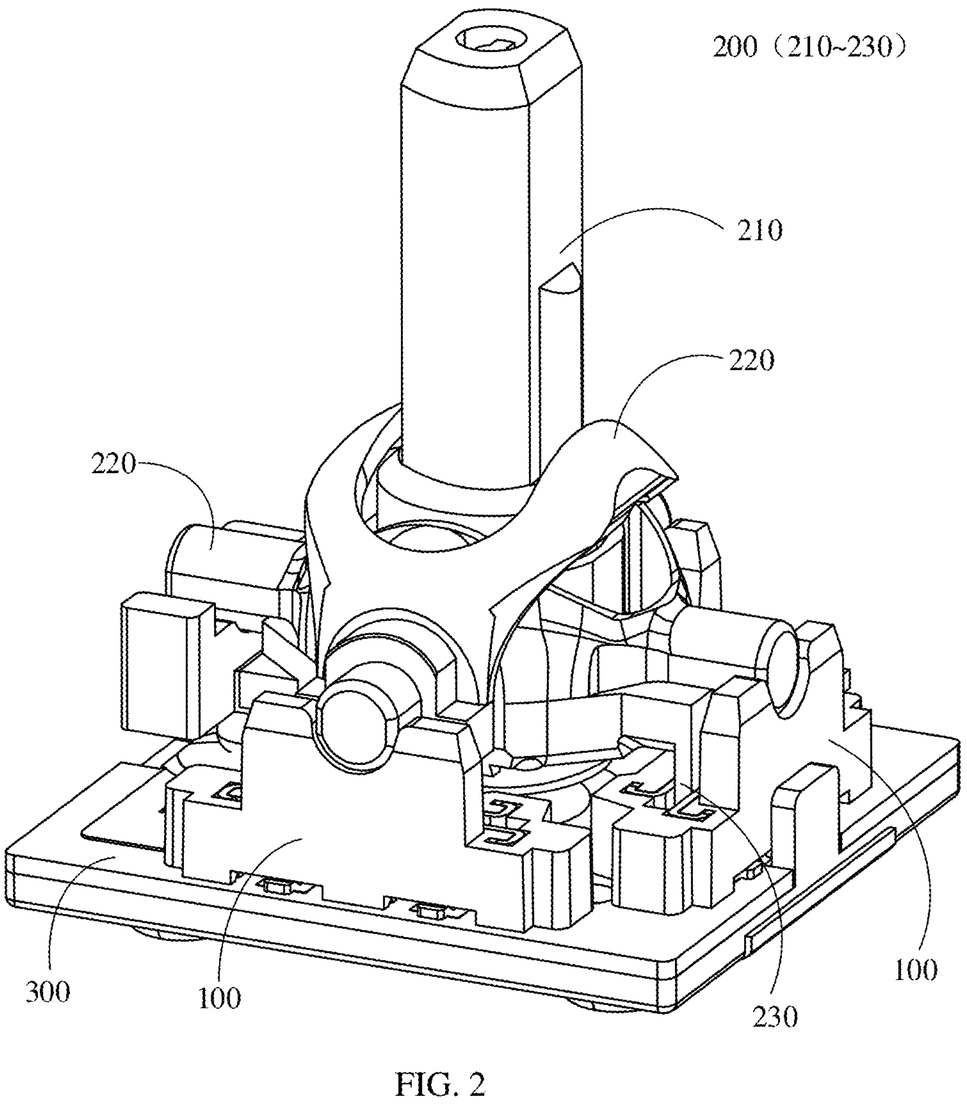
FIG. 2 is a structural view of internal components in FIG. 1.
Figure 3:
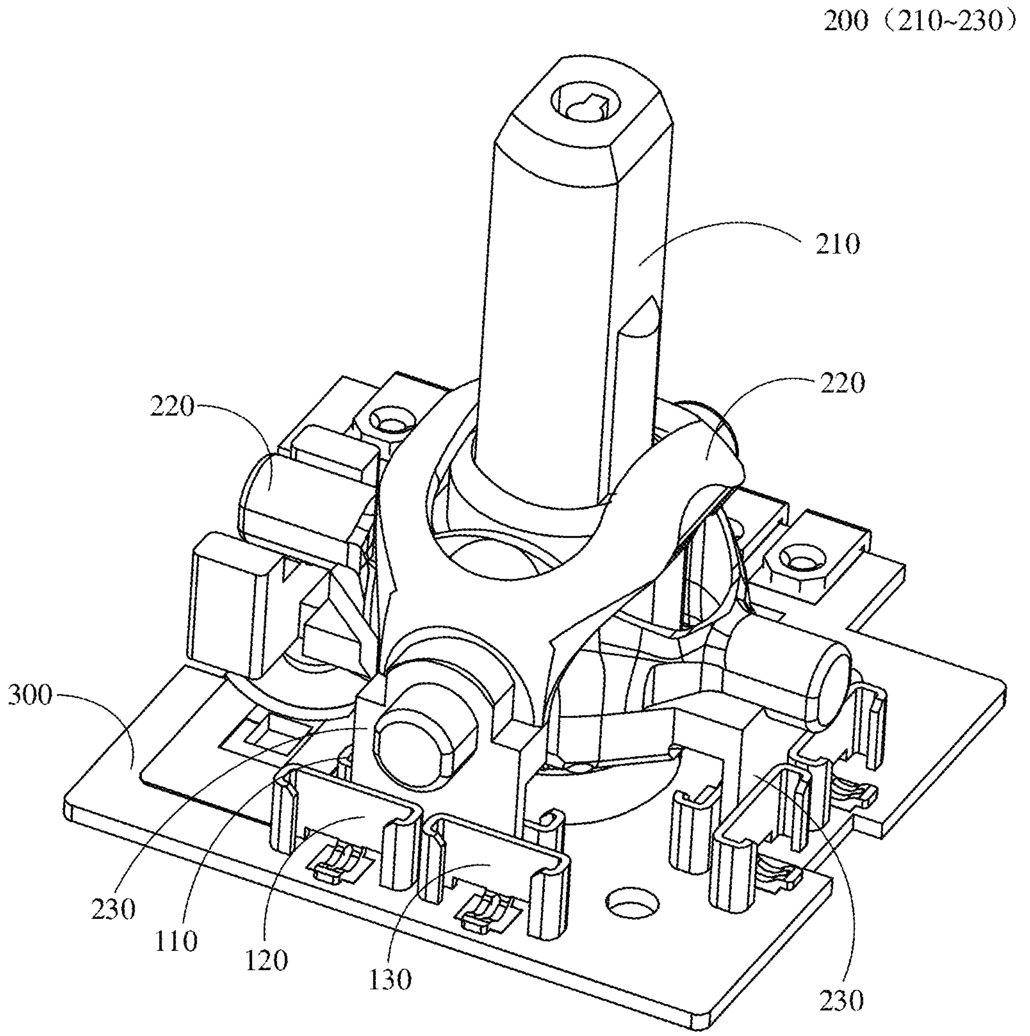
FIG. 3 is a schematic structural view of FIG. 2 with the electrode piece installation seat hidden.
Figure 4:
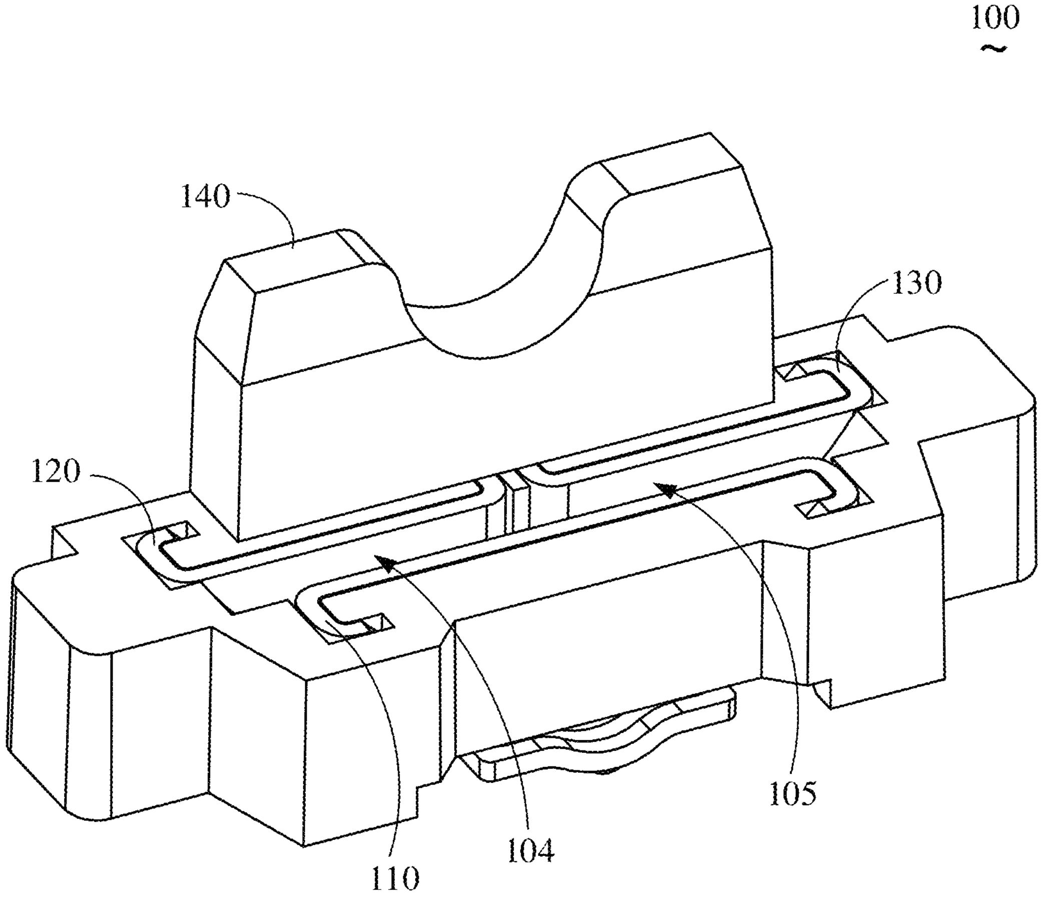
FIG. 4 is a schematic structural view of a capacitive sensing assembly in FIG. 2 according to an embodiment of the present application.
Figure 5:
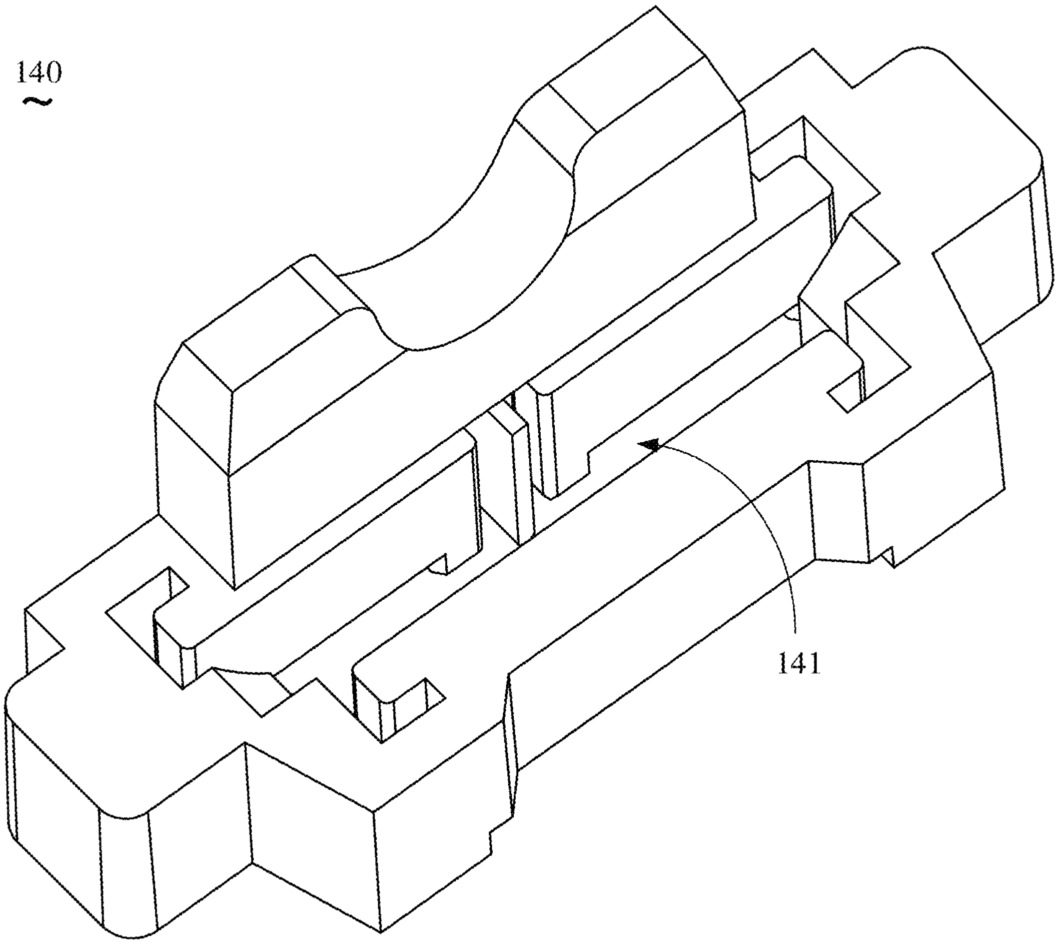
FIG. 5 is a schematic structural view of an electrode piece installation seat in FIG. 4 according to an embodiment of the present application.

In an embodiment, please referring to FIG. 2 and FIG. 5, the capacitive sensing assembly 100 also includes an electrode piece installation seat 140 provided with an installation groove 141 for installing the first electrode piece 110, the second electrode piece 120 and the third electrode 130. The installation groove 141 is a through groove, and the installation groove 141 usually adapts to the shape of the electrode piece.

Based on the previous embodiment, the electrode piece body 101 and the connecting portion 102 are arranged at an angle. The connecting portion 102 is snap-connected with the installation seat. In this way, the structure between the installation seat and the electrode piece is optimized, so that the components between the capacitive sensing assemblies 100 are directly connected through their own structures without the need for additional connecting structures, further simplifying the structure of the rocker apparatus 10.

In an embodiment, please referring to FIG. 6, the first electrode piece 110, the second electrode piece 120 and the third electrode piece 130 also respectively includes a folding portion 103, and the connecting portion 102 and the folding portion 103 are provided at the same side of the electrode piece body 101. The folding portion 103 can be provided with only one folding subsection or a plurality of folding subsections, so that the electrode piece can be better stuck into the installation groove 141 and the structure is relatively simple. In an embodiment, the folding portion 103 includes two folding subsections, and the folding angles of the two folding subsections are within the range of 30 degrees to 150 degrees.

In an embodiment, the connecting portion 102 and the folding portion 103 are provided on a side of the electrode piece body 101 away from the first facing spacing 104 and the second facing spacing 105. In this way, the swing of the swing member 230 can be facilitated, and the distance between the first electrode piece 110 and the third electrode piece 130 and the distance between the second electrode piece 120 and the third electrode piece 130 can also be narrowed, thereby miniaturizing the capacitive sensing assembly 100.

In an embodiment, the electrode piece body 101, the connecting portion 102 and the folding portion 103 are integrally formed.

In an embodiment, the rocker assembly 200 includes a rocker body 210, a rocker arm 220 and a swing member 230 provided on the rocker arm 220. The rocker arm 220 is sleeved on the rocker, and the rocker arm 220 can swing in a first direction and a second direction that are perpendicular to each other after being pushed by the rocker. The swing member 230 is swingably provided in the first facing spacing 104 and the second facing spacing 105.

The rocker apparatus 10 mainly includes a rocker body 210 and two rocker arms 220, and the number of capacitive sensing assemblies 100 is adapted to the number of rocker arms 220. The rocker arm 220 is also provided with a swing member 230. The user moves the rocker body 210 to drive the rocker arm 220 to operate. The swing member 230 swings in the first facing spacing 104 and the second facing spacing 105 with the operation of the rocker arm 220. The capacitance of the first capacitor and the capacitance of the second capacitor may change as the position of the rocker body 210 changes. The swing member 230 can be integrally formed with the rocker arm 220, or the swing member 230 can be installed on the rocker arm 220. The rocker apparatus 10 usually includes two sets of capacitive sensing assemblies 100.

In an embodiment, in order to reduce the swing space required by the swing member 230 between the first facing spacing 104 and the second facing spacing 105, the end surface of one end of the first facing spacing 104 and the second facing spacing 105 where the swing member 230 is inserted is in a convex arc shape.

The present application also provides a handle remote control, including the rocker apparatus 10. The specific structure of the rocker apparatus 10 refers to the above-mentioned embodiments. Since the handle remote control adopts all the technical solutions of all the above-mentioned embodiments, it has at least all the beneficial effects brought by the technical solutions of the above embodiments, which will not be repeated here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A rocker apparatus, comprising:

a capacitive sensing assembly comprising a first electrode piece, a second electrode piece and a third electrode piece, wherein the second electrode piece and the third electrode piece are provided on a same side of the first electrode piece; a first facing spacing is provided between the first electrode piece and the second electrode piece to form a first capacitor; and a second facing spacing is provided between the first electrode piece and the third electrode piece to form a second capacitor;

a rocker assembly, wherein a part of the rocker assembly is swingably provided in the first facing spacing and the second facing spacing, and a capacitance of the first capacitor and a capacitance of the second capacitor are configured to change with a swinging of the rocker assembly; and a control assembly comprising an electric control board and a capacity detection chip provided on the electric control board and electrically connected to the electric control board, wherein the electric control board and the capacity detection chip are electrically connected to the first electrode piece, the second electrode piece and the third electrode piece respectively; the capacity detection chip is configured to detect the capacitance of the first capacitor and the capacitance of the second capacitor; and the electric control board is configured to output corresponding position information based on a ratio change of the capacitance of the first capacitor to the capacitance of the second capacitor;

wherein the first electrode piece, the second electrode piece, and the third electrode piece each comprises an electrode piece body and a connecting portion provided on the electrode piece body;

the connecting portion is provided with a first end and a second end opposite to the first end;

the first end is connected to the electrode piece body;

a curved dome portion is formed between the first end and the second end, and the curved dome portion is abutted against the electric control board; and the curved dome portion is provided with a convex subsection connected to the electric control board.

2. The rocker apparatus according to claim 1, wherein the capacitive sensing assembly further comprises an electrode piece installation seat, and the installation seat is provided with an installation groove for installing the first electrode piece, the second electrode piece and the third electrode piece.

3. The rocker apparatus according to claim 2, wherein the electrode piece body and the connecting portion are provided at an angle, and the connecting portion is snap-connected to the installation seat.

4. The rocker apparatus according to claim 3, wherein the first electrode piece, the second electrode piece, and the third electrode piece each further comprises a folding portion, and the connecting portion and the folding portion are provided on a same side of the electrode piece body.

5. The rocker apparatus according to claim 4, wherein the connecting portion and the folding portion are provided on one side of the electrode piece body away from the first facing spacing and the second facing spacing.

6. The rocker apparatus according to claim 1, wherein the rocker assembly comprises a rocker body, a rocker arm sleeved on the rocker and a swing member provided on the rocker arm;

the rocker is configured to push the rocker arm to swing; and the swing member is swingably provided in the first facing spacing and the second facing spacing.

7. The rocker apparatus according to claim 6, wherein an end surface of the swing member inserted into one end of the first facing spacing and the second facing spacing is provided in a convex arc shape.

8. A handle remote control, comprising the rocker apparatus according to claim 1.

* * * * *